Jan. 5, 1971

G. V. WOODLING 3,552,892

ROTATIONAL DRIVE MEANS FOR ROTARY VALVE IN
FLUID PRESSURE DEVICE

Filed Feb. 6, 1969

INVENTOR.
GEORGE V. WOODLING
BY
Woodling, Krost, Granger and Rust.
attys.

INVENTOR.
GEORGE V. WOODLING

INVENTOR.
GEORGE V. WOODLING
BY
Woodling, Krost, Granger and Rust
attys.

United States Patent Office 3,552,892
Patented Jan. 5, 1971

3,552,892
ROTATIONAL DRIVE MEANS FOR ROTARY
VALVE IN FLUID PRESSURE DEVICE
George V. Woodling, 22077 W. Lake Road,
Rocky River, Ohio 44116
Continuation-in-part of application Ser. No. 742,571,
July 5, 1968. This application Feb. 6, 1969, Ser.
No. 797,223
Int. Cl. F01c 1/08
U.S. Cl. 418—61                              1 Claim

ABSTRACT OF THE DISCLOSURE

The drive means is especially adapted to rotate a rotary valve in a fluid pressure device having stator means and rotor means constituting a fluid stator-rotor mechanism. An actuating shaft operatively connected to the rotor means is disposed to rotate the rotary valve one rotation for each rotation of the actuating shaft. The rotary valve has a first axis about which it is disposed to rotate. The actuating shaft extends through a central opening in the rotary valve and has a second axis disposed for substantially circular orbital movement about the first axis. The actuating shaft is also disposed for rotational movement about the second axis and has a combined movement comprising said substantially circular orbital movement and said rotational movement. The rotary valve and the actuating shaft have an overlapping circumferential driving relationship therebetween, whereby the rotary valve is rotated in response to the combined movement of the actuating shaft with the orbital movement substantially free from drive interference.

BACKGROUND OF THE INVENTION

This application is a continuation-in-part of my pending application, Ser. No. 742,571, filed July 5, 1968, now abandoned.

In a fluid pressure device embodying a stator-rotor mechanism having stator and rotor means, a rotary valve controls the entrance of fluid to and the exit of fluid from the stator-rotor mechanism. The rotary valve is disposed to be driven by an actuating shaft operatively connected to the rotor means. The present invention relates to drive means between the acuating shaft and the rotary valve, whereby the rotary valve is rotated one rotation for each rotation of the actuating shaft. The drive means is not one of simple rotation, because, the autuating shaft, which is operatively connected to the rotor means, partakes of a combined movement corresponding to that of the rotor means. In appreciating this combined movement, it is first to be noted that the rotary valve has a first axis about which it is disposed to rotate. The actuating shaft, since it is operatively connected to the rotor means, has a second axis disposed for substantially circular orbital movement about the first axis. The actuating shaft is also disposed for rotational movement about the second axis. Thus, the actuating shaft has a combined movement comprising the substantially circular orbital movement, plus the rotation movement. It is the circular orbital movement which complicates the drive problem.

Accordingly, it is an object of my invention to provide for transmitting rotational movement to the rotary valve while permitting orbital clearance within the limits of normal back-lash.

Another object is the provision of rotational drive means embodying drive actuating means and drive follower means, wherein a relatively close driving tolerance (normal back-lash) may be maintained between the drive means and still allow the orbital movement to occur without drive interference.

Another object is to provide an over-lapping circumferential driving relationship between the drive actuating means and the drive follower means to effect substantially one rotation of the rotary valve for each rotation of the actuating shaft.

SUMMARY OF THE INVENTION

The invention constitutes drive means for transmitting a torque between first and second members, said first member having a first axis about which it may rotate, said second member having a second axis disposed for substantially circular orbital movement about said first axis, said second member being also disposed for rotational movement about said second axis, whereby said second member has a combined movement comprising said substantially circular orbital movement and said rotational movement, said first member having drive follower means circumferentially disposed with reference to said first axis, said second member having drive actuating means circumferentially disposed with reference to said second axis, said drive follower means and said drive actuating means having a relative movement therebetween defining substantially a clearance circle, one of said drive means having female wall means and the other of said drive means having male wall means, one of said walls means circumferentially over-lapping the other of said wall means and effecting an over-lapping circumferential driving relationship therebetween, said over-lapping circumferential driving relationship in response to said rotational movement actuating said first member substantially one rotation for each rotation of said second member and orbitally clearing said male and female wall means from each other in response to said circular orbital movement.

Other objects and a fuller understanding of this invention may be had by referring to the following description and claims, taken in conjunction with the accompanying drawings, in which:

Figure 16:
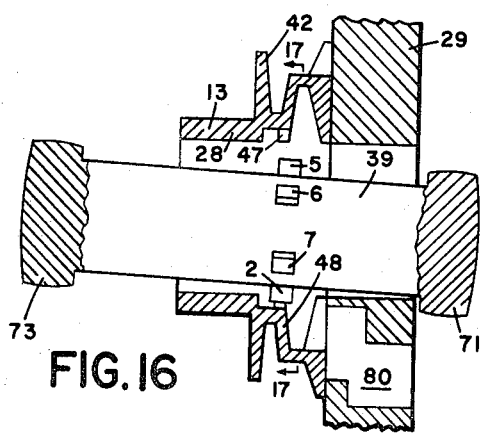
FIG. 16 is a fragmentary view of FIG. 1, showing a modified drive means between the rotary valve and the actuating shaft.
Figure 17:
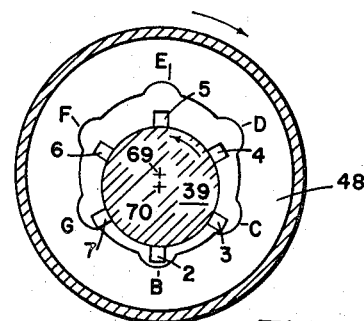
Figure 18:
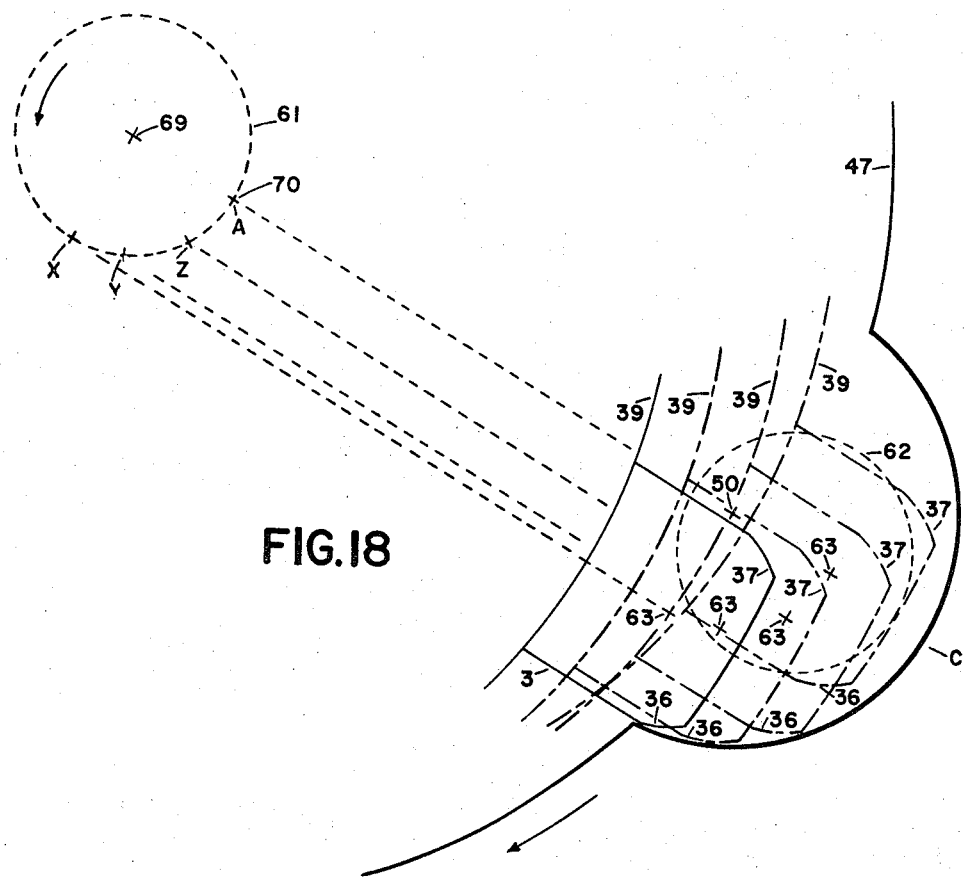

FIG. 17 is a view looking at the right-hand side of the drive means in FIG. 16, taken along the line 17—17 thereof, showing six regional drive locations; and FIG. 18 is an enlarged view of a construction diagram showing one of the regional drive locations and illustrating the overlapping, circumferential driving relationship between the drive actuating means and the drive follower means at four different orbit positions of the actuating shaft.

DESCRIPTION OF THE PREFERRED EMBODIMENT

The figures of the drawing show a preferred embodiment of the invention but this is only by way of illustration; it is not to be taken as limiting, the invention being limited only by the hereinafter appended claims.

Briefly, the fluid pressure device comprises a main housing 20, a main shaft 25 rotatively mounted in the housing, a stator-rotor mechanism 31 having a stator element 32 and a rotor element 33, a stationary valve member 29 and a rotary valve member 28. An end cap 34 enclosed the stator-rotor mechanism. The end cap may be held by screws 35. An actuating shaft 39 drivingly interconnects the main shaft 25 to the rotor element 33. The actuating shaft 39 has an intermediate portion 38 disposed to rotate the rotary valve 28 through a rotational drive means including cam actuating means indicated generally by the reference character 40. The stationary valve member 29 has face wall means including a stationary valve face 81 abutting against the end wall of the housing 20, whereby the housing and the stationary valve member constitute enclosure means for the rotary valve. The stationary valve member 29 may be secured to the end of the housing 20 by screws 30. The housing 20 is hollow from end-to-end, and intermediate the ends of the hollow housing, there is provided an internal rib 21, which generally separates the hollow housing into a left-hand end compartment in which the main shaft 25 is rotatively mounted and a right-hand end compartment in which the rotary valve is rotatively mounted.

Figure 3:
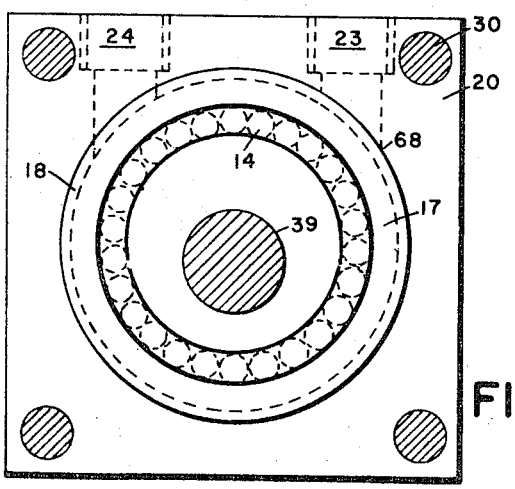
FIG. 3 is a view taken along the line 3—3 of FIG. 1, with the rotary valve being omitted, the view being principally a right-hand end view of the hollow housing showing the fluid ports and the bearing support means for the rotary valve, including a cross-section of the actuating shaft.

Pressed against the internal rib 21 is a bushing 22 having a right-hand stationary end face 17 disposed substantially parallel to and spaced axially from the stationary valve face 81. The rotary valve 28 is mounted between the stationary valve face 81 and the stationary end face 17 and has a rotary valve face 82 which makes a fluid sealing engagement with the stationary valve face 81 and a rotary end face 66 which makes a fluid sealing engagement with the stationary end face 17. The rotary valve 28 is mounted within a counter bore having an internal wall surface 68 surrounding and radially spaced from the rotary valve member 28 and defines therewith external (first) annular fluid chamber means which extends all the way around the rotary valve member. The external annular fluid chamber is connected in constant fluid communication with a fluid port 23 provided in the housing 20, see FIG. 3. The fluid port 23 extends through the housing wall and intersects with the internal wall surface 68, next adjacent the right-hand side of the bushing 22.

The rotary valve member 28 has a hollow shaft 13 with inside and outside surfaces. The hollow shaft 13 extends from the rotary valve member and has a bearing portion mounted within an anti-friction roller bearing unit 14. The bearing unit 14 comprises a plurality of roller bearings encompassing the bearing portion of the hollow shaft 13 and mounted within a cup 15 which is pressed into the inner surfaces of the rib 21 and the bushing 22. The hollow shaft 13 extends through, and has a terminating end portion provided with substantially diametrically opposite bosses 26 and 27 projecting in an axial direction beyond the roller bearing unit 14 and driven by the cam actuating means indicated by the reference character 40.

The rotary valve member 28 has a central opening defined by internal wall surface means 76. This opening, including also the opening in the hollow shaft 13, constitutes internal (second) annular fluid chamber means connected in constant fluid communication with a fluid port 24 provided in the housing 20, see FIG. 3. The fluid port 24 extends through the housing wall and intersects with an internal bore 18, next adjacent the left-hand side of the internal rib 21.

Figure 1:
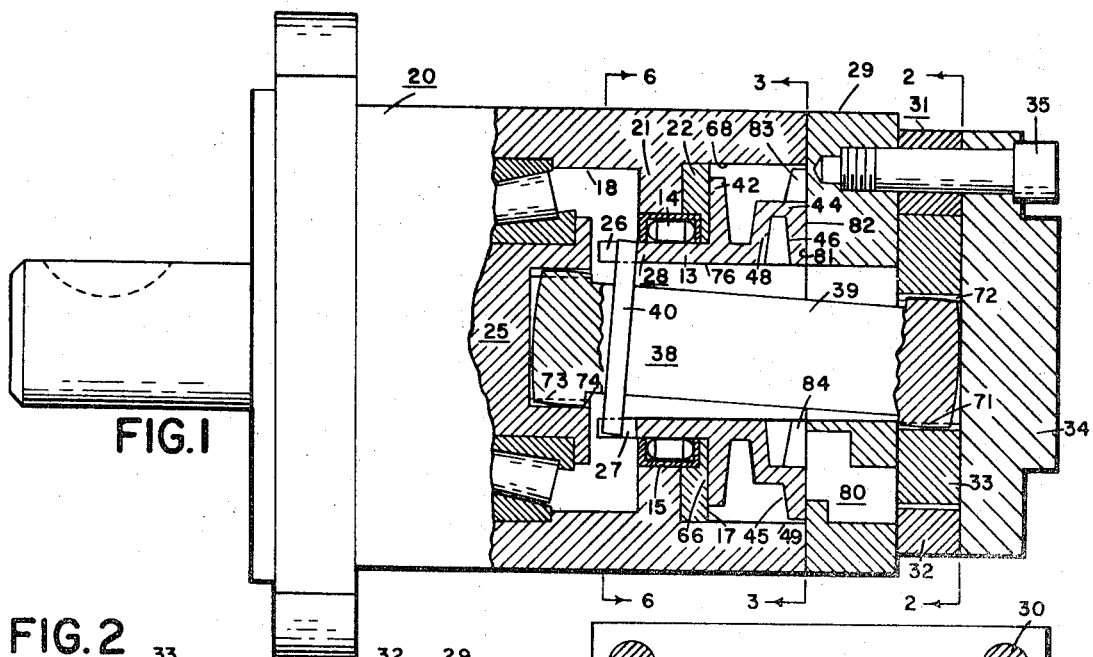
FIG. 1 is a side view of a fluid pressure device, in which my invention may be incorporated, partly shown in vertical section to illustrate the rotary valve for controlling the entrance of fluid to and the exit of fluid from the stator-rotor mechanism, the section through the rotary valve being taken along the line 1—1 of FIG. 5.
Figure 5:
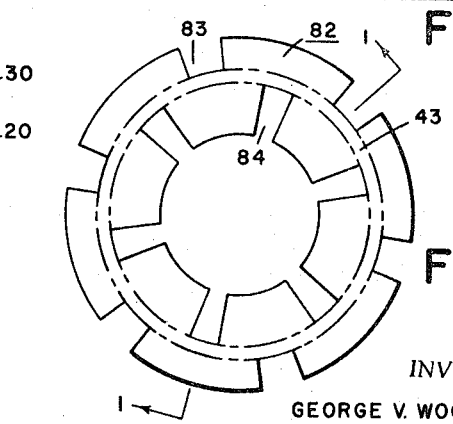
FIG. 5 is a view taken along the line 3—3 of FIG. 1, showing only the rotary valve face which sealingly engages the stationary valve face of FIG. 4.
Figure 6:
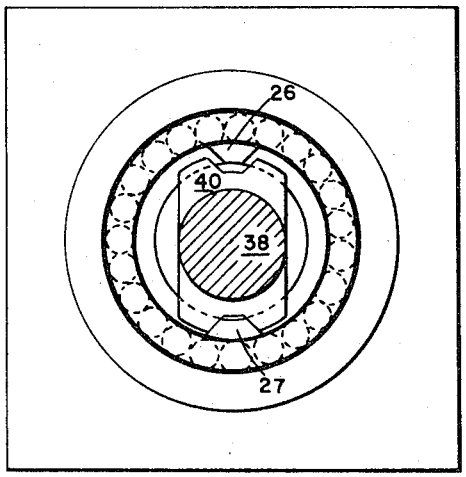
FIG. 6 is a view taken along the line 6—6 of FIG. 1, showing principally an end view of the anti-friction bearings and a cross-section of the actuating shaft with the cam actuating means extending diametrically and outwardly therefrom and engaging the cam follower means on the rotary valve.

As shown in FIG. 1, the hollow shaft 13 of the rotary valve 28 has an external annular flange 42 connected thereto and is provided with a sealing surface constituting the rotary end face 66 in fluid sealing engagement with the stationary end face 17 of the bushing 22. The hollow shaft 13, between the stationary end face 17 and the stationary valve face 81, may be characterized as comprising an annular valve body having a terminating end portion 44 with an end face constituting an annular surface area band 43, see FIG. 5, where the band 43 is indicated by the concentric dash-dot lines. The terminating end portion 44 has an external flange-rim 45 extending outwardly therefrom and an internal flange-rim 46 extending inwardly therefrom. Preferably, there is a clearance 49 between the outside of the external flange-rim 45 and the internal wall surface 68, with the result the rotary valve is solely supported for rotation by the anti-friction bearing unit 14. The external flange-rim 45 separates fluid in the external (first) annular fluid chamber from the stationary valve face 81 and the internal flange-rim 46 separates fluid in the internal (second) annular fluid chamber from the stationary valve face 81. The external flange-rim 45 and the internal flange-rim 46 define a rotary face which, together with the annular surface area band 43, constitutes the rotary valve face 82. The terminating end portion 44 of the annular valve body from which the external and internal flange-rims 45 and 46 extend, may be characterized as a common intermediate annular body portion having a diameter greater than that of the hollow shaft 13. The common intermediate annular body portion is connected to the hollow shaft 13 by a sloping annular connecting disk or web 48.

In this application, the term "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about said fixed axis of the stator. Thus, in this application, the outer surrounding element, usually referred to as the stator, may be either the stator or the rotor, depending upon whether it has a fixed axis or a movable axis and the inner element, usually referred to as the rotor, may be either the rotor or the stator depending upon whether it has a movable axis or a fixed axis.

In the description, my device will be described as a fluid motor, but it is understood that it may be utilized for any other related purpose, particularly a pump.

Figure 2:
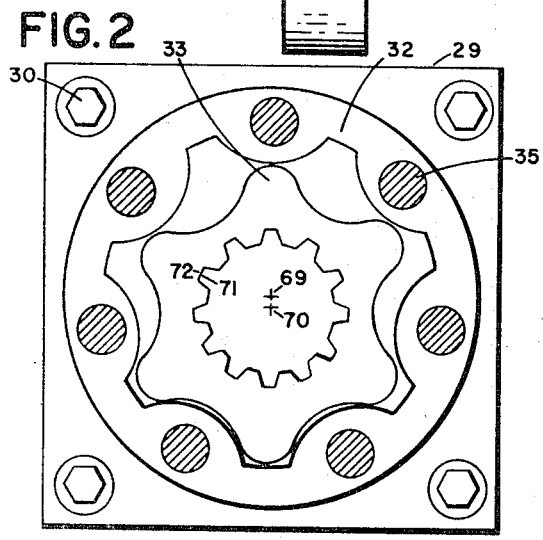
FIG. 2 is a view taken along the line 2—2 of FIG. 1, under the end cap, showing the stator-rotor mechanism.

As illustrated in FIG. 2, the stator element 32 has seven internal teeth which define the outer wall of a fluid compartment. The rotor element 33 has six external teeth, one less than that of the stator element. The stator element may be described as having n number of internal teeth and the rotor element may be described as having n—1 number of external teeth. The stator element has a center 69, usually referred to as the fixed or stationary axis since the stator element is stationarily mounted and does not rotate. In this application and claims, the expression "fixed stator axis" or simply "fixed axis," includes not only the fixed axis of the rotor, but also any axis which coincides, or is in axial alignment therewith.

The rotor 33 has a movable axis, identified by the reference character 70, and is radially spaced from and moves in an orbital path about the fixed axis 69 of the stator. The orbital path of the movable axis 70 is a true circle with its center coinciding with the fixed axis of the stator. The diameter of the true circle, orbital path, is equal to the difference in the radial dimension between the crest contour and the root contour of a stator tooth. Upon relative movement between the rotor and the stator, the movable axis 70 of the rotor orbits in a true circle about the fixed axis of the stator. As the rotor moves within the stator, the inter-meshing teeth of the rotor and stator divide the fluid compartment confined therebetween into high and low pressure chambers along a revolving divisional line passing substantially diametrically through the fixed axis of the stator. For the position in FIG. 2, the divisional line is substantially diametrically vertical. For the position shown in FIG. 2, the divisional line may be more properly described as a divisional tapering band rather than a line and comprises substantially a slender triangle having an apex at the point where the top rotor tooth in FIG. 2 touches or contacts the arcuate surface of the stator contour and having a base defined by the distance between the sealing contact engagement on opposite sides of the bottom rotor tooth when fitting full-depth into the bottom stator tooth. To rotate the rotor 33 in a clockwise direction, the chambers on the left-hand side of the revolving divisional line or tapering band become high pressure chambers and the chambers on the right-hand side become low pressure chambers. The high and low pressure chambers, which may be referred to as operating chambers, alternately expand and contract as the rotor and stator move relative to each other. The divisional line or tapering band continually revolves in a counter-clockwise direction as the rotor rotates in a clockwise direction within the stator.

As shown in FIG. 1, the actuating shaft 39 has a right-hand end portion provided with male spline teeth 71 which fit within female spline teeth 72 in the rotor, being referred to herein as first connection means. Thus, the right-hand end portion of the actuating shaft 39 is disposed for rotational movement about its own movable axis and for orbital movement about the fixed axis of the stator. The connection means between the left-hand end portion of the actuating shaft 39 and the main shaft 25, herein referred to as second connection means, also comprises male spline teeth 73 on the actuating shaft 39 which fit within female spline teeth 74 in the central core of the main shaft 25. The left-hand end portion of the actuating shaft, that is the second connection means, is disposed for rotational movement substantially free from orbital movement about the fixed axis of the stator. A third connection means comprises the cam actuating means indicated by the dotted line 40 which interconnects the intermediate shaft portion 38 with the bosses 26 and 27 for rotating the rotary valve 28 one rotation for each rotation of the actuating shaft.

The valve system means in the present application, comprising the rotary valve member 28 and the stationary valve member 29, operates substantially the same as that shown and described in my pending application Ser. No. 715,247, filed Mar. 22, 1968. To this end, the external flange-rim 45 has a first series of six commutating fluid connection means 83 extending therethrough and connects the external (first) annular fluid chamber means, outside of the rotary valve, in constant fluid communication with the stationary valve face 81. The internal flange-rim 46 has a second series of six commutating fluid connection means 84 extending therethrough and connects the internal (second) annular fluid chamber means, inside the rotary valve, in constant fluid communication with the stationary valve face 81. The annular surface area band 43 is disposed between and sealingly separates the first and second series of commutating fluid connection means 83 and 84. It will also be seen that the common intermediate annular body portion 44 separates the first and second series of commutating fluid connection means 83 and 84. The first and second series of commutating connection means are alternately disposed with respect to each other and are circumferentially disposed relative to the fixed axis and spaced at annular intervals thereabout at substantially 30 degrees from each other. The stationary valve member 29 has seven fluid openings 80 communicating respectively with the operating fluid chambers in the stator-rotor mechanism. The seven fluid openings 80 in the stationary valve member 29 terminate respectively in the stationary valve face 81, with the fluid opening being circumferentially disposed about the fixed axis and spaced at annular intervals thereabout at 51 3/7 degrees from each other.

In operation as a fluid motor, high pressure fluid from the high pressure port 23 commutatively flow through the first series of commutating fluid connection means 83 of the rotary valve into the fluid openings 80 of the stationary valve member 29 and thence into the expanding pressure fluid chambers in the stator-rotor mechanism and drives the rotor 33 in a clockwise rotational direction within the stator 32. As the rotor is driven, the exhaust fluid in the low pressure contracting chambers commutatively flows through the fluid openings 80 of the stationary valve 20 into the second series of fluid commutating connection means 84 of the rotary valve and thence to the low pressure port 24. As the rotor is driven by the high pressure fluid, it operates the main shaft 25 through the actuating shaft 39.

Figure 4:
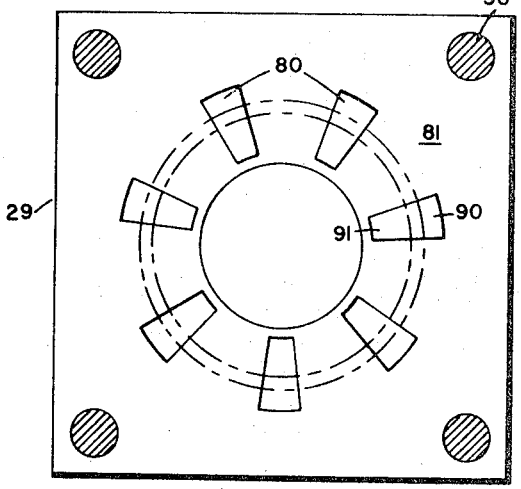
FIG. 4 is a view taken along the line 3—3 of FIG. 1, but looking in a direction opposite from that indicated by the arrows and showing the side of the stationary valve member against which the rotary valve sealingly engages.

The registration of the fluid connection means provided by the rotating valve face 82 in sealing engagement with the stationary valve face 81 is such that there is a first series of commutating fluid connections between the high pressure port 23 and the expanding fluid chambers in the stator-rotor mechanism and a second series of commutating fluid connections between the contracting fluid chambers and the low pressure port 24. In FIG. 4, the place where the annular surface area band 43 rotates against the stationary valve face 81, is illustrated by the concentric dash-dot lines being the same as the dash-dot lines in FIG. 5. Thus, the terminal openings 80 have an outer portion 90 and an inner portion 91 respectively residing outside and inside the place where the annular surface area band 43 rotates against the stationary valve face 81. As will be seen, the outer portion 90 and the external (first) annular fluid chamber, outside of the rotary valve, are commutatively connected together, and the inner portion 91 and the internal (second) annular fluid chamber, inside of the rotary valve, are commutatively connected together. In this construction, the terminal openings 80 have an elongated dimension in a radial direction extending across the annular band 43, whereby fluid may commutatively flow through both the first and second series of fluid connection means 83 and 84. The elongated dimension of the terminal openings 80 are such that they radially overlap the first and second series of fluid connection means 83 and 84 during commutation movement.

The rotating valve 28 is independent of any radial thrust or of any end thrust to which the main shaft 25 may be subjected. Also the rotating valve 28 is substantially free from any radial thrust or any end thrust due to fluid pressure acting thereupon. In summary, the valve system means, including the rotary valve 28 and the stationary valve member 29, control the entrance of fluid to and the exit of fluid from the operating chambers of the stator-rotor mechanism.

Figure 7:
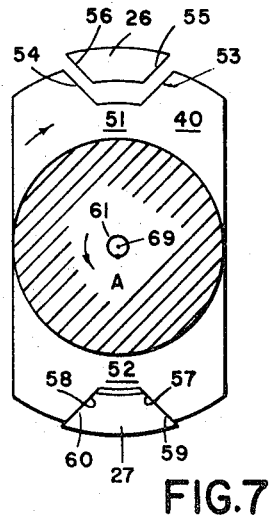
FIG. 7 is an enlarged, profile view of the cam actuating means and the cam follower means in FIG. 6, the orbital movement of the cam actuating means being indicated by the center circle.

The drive means for the rotary valve comprises the cam actuating means 40 disposed to engage the bosses 26 and 27 which function as cam follower means. The cam area located generally around the boss 26 may be referred to as a first cam operating region, identified by the reference character 51 and the cam area located generally around the boss 27 may be referred to as a second cam operating region, identified by the reference character 52. In the drive means for the rotary valve of the present application, the movement and the contour (profile) of the cam actuating means and the cam follower means (bosses) is such that a relatively close driving tolerance (normal back-lash) may be maintained therebetween and still allow for the actuating shaft 39 to orbit without substantially any cam interference. As shown in FIG. 7, the first cam operating region 51 comprises a set of opposed cam actuating portions 53 and 54 and a set of opposed cam follower portions 55 and 56 and the second cam operating region 52 comprises a set of opposed cam actuating portions 57 and 58 and a set of opposed cam follower portions 59 and 60. The cam operating regions 51 and 52 comprise a pair of regions disposed substantially diametrically opposite each other on opposite sides of the fixed axis 69. The shaft 39, including the cam actuating means 40, being operatively connected to the rotor element 33, has a combined movement relative to the cam follower means 26 and 27 (bosses). The combined movement comprises a rotational movement about the movable axis and a circular orbital movement about the fixed axis. Observing FIG. 7, the rotational movement is clockwise and the orbital movement, represented by the circle 61, is counter-clockwise. The small dot at the point A may be considered as the starting point of the orbital movement. The cam actuating means 40, that is a diametrical center-line passing through the fixed axis thereof, is vertical. The wall means defined by the set of opposed cam actuating portions 53 and 54 and by the set of opposed cam actuating portions 57 and 58 may be characterized as female wall means, and the wall means defined by the set of opposed cam follower portions 55 and 56 and by the set of opposed cam follower portions 59 and 60 may be characterized as male wall means. The male and female wall means have a relative movement therebetween which defines a clearance circle substantially the same as the orbital movement represented by the circle 61. The opposing cam actuating portions 53 and 54 of the cam operating region 51 and the opposing cam actuating portions 57 and 58 of the cam operating regions 52 respectively define an included angle therebetween of substantially ninety degrees. The respective cam actuating portions themselves are disposed at an angle of substantially forty-five degrees with respect to a diametrical center-line passing through the fixed axis. Similarly, the opposing cam follower portions 55 and 56 and the opposing cam follower portions 59 and 60 respectively define an included angle therebetween of substantially ninety degrees. The respective cam follower portions themselves are disposed at an angle of substantially forty-five degrees with respect to a diametrical center-line passing through the fixed axis. Thus the cam actuating portions and the cam follower portions circumferentially over-lap each other and effect a circumferential over-lapping relationship therebetween. The cam actuating portion 54 and the cam follower portion 56 are juxtapositionably disposed in substantially circumferential alignment with each other for driving the rotary valve. The same is true for the cam actuating portion 57 and the cam follower portion 59. The cam actuating portions 53 and 58 and the cam follower portions 55 and 60 come into play for reverse operation of the rotary valve in a counter-clockwise direction.

Figure 8:
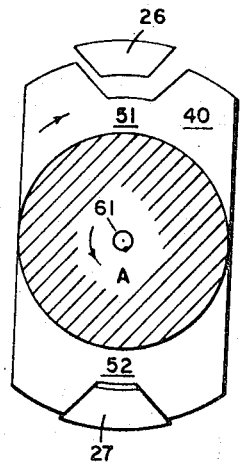
FIGS. 8, 9, 10 and 11, are profile views of the cam means similar to FIG. 7, respectively, showing advanced positions thereof in response to rotational and orbital movements of the cam means.
Figure 9:
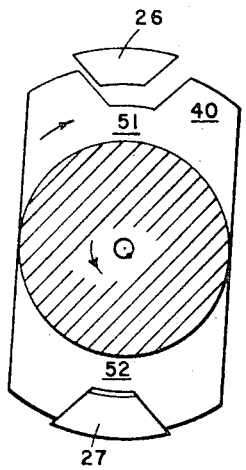
Figure 10:
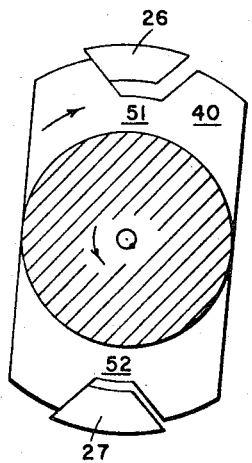
Figure 11:
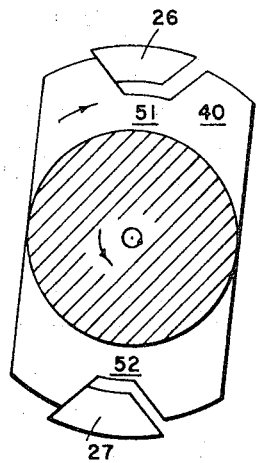

In FIG. 7, the cam actuating portion 57 is drivingly contacting the cam follower portion 59 and is disposed to drive same in a clockwise direction. The rotary valve is disposed to be rotated one revolution for six orbital cycles of the cam actuating means 40. The effect of the rotational movement and the orbital movement is progressive illustrated in the FIGS. 8, 9, 10 and 11. In FIG. 8, the orbital movement (small dot) has advanced fifteen degrees in a counter-clockwise direction from position A; in FIG. 9, thirty degrees; in FIG. 10, forty-five degrees; and in FIG. 11, sixty degrees. The respective figures also illustrate the advancement of the cam actuating means 40 in a clockwise direction. In FIGS. 7 to 9, inclusive, the cam actuating portion 57 is in driving contact with the cam follower portion 59. However, in FIG. 10, the cam actuating portion 54 has just started to make a driving contact with the cam follower portion 56. In FIGS. 10 and 11, the cam actuating portion 57 is no longer in driving contact with the cam follower portion 59. The illustrated operations continue to carry through in a similar fashion for the complete orbital cycle until the small dot reaches the point A, whereupon the cycle continues to repeat itself. It is to be observed in the respective figures that the cam actuating means 40 is permitted to orbit without substantially any cam interference. This substantial non-interference results from the fact that the cam actuating portions and the cam follower portions circumferentially over-lap each other at substantially a forty-five degree angle with respect to a diametrical line passing through the fixed axis. In the general operation of contacting cams, gears or other machine parts, there is a normal clearance (back-lash) between them which provides for ease of operation. This normal clearance is, of course, present in the illustrated cam arrangement, but otherwise there is very little cam interference resulting from the relative orbital movements. Whatever cam interference there may tend to be, it is well within the limits of the normal back-lash and thus absorbed.

In operation, the respective cam actuating portions and the respective cam follower portions circumferentially abut each other and transmit a torque therebetween in response to the circumferential relative movement and orbitally clear each other in their circumferential over-lapping relationship in response to the orbital relative movement.

Figure 12:
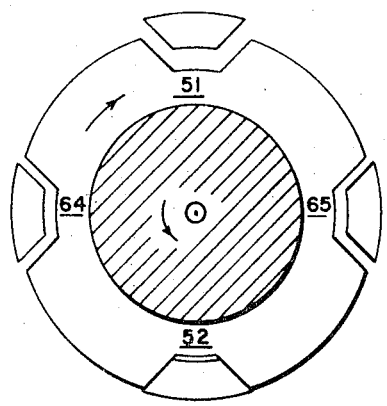
FIG. 12 is a view similar to FIG. 7, but showing a modification of the cam means, in that there are four operating cam regions circumferentially disposed around the fixed axis instead of two, as shown in FIG. 7.

In FIG. 12, a further arrangement of the cam means is illustrated which is disposed to provide a finer control over the fluid timing of the rotary valve. In this arrangement, there are four cam operating regions, identified by the reference characters 51 and 52 (being the same as shown in FIG. 7) and 64 and 65. The cam regions 51 and 52 may be considered as a first pair of regions and the regions 64 and 65 may be considered as a second pair of regions. The first and second pairs of regions are disposed substantially ninety degrees apart from each other circumferentially around the fixed axis. The regions 51 and 52 are disposed substantially diametrically opposite each other on opposite sides of the fixed axis and the regions 64 and 65 are likewise disposed substantially diametrically opposite each other on opposite sides of the fixed axis. In other respects, the cam operating regions in FIG. 12 are substantially the same as those shown in FIG. 7.

The operation of the arrangement shown in FIG. 12 is substantially the same as that illustrated in FIGS. 7 to 11, inclusive, except that there is a finer control over the fluid timing of the rotary valve, since there are four cam operating regions instead of two.

Figure 13:
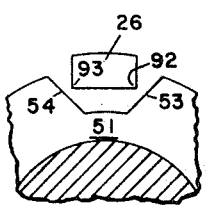
FIG. 13 is a fragmentary view of a cam region showing a modified profile of the cam means.
Figure 14:
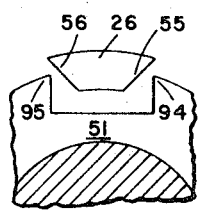
FIG. 14 is a fragmentary view similar to FIG. 13 showing another modified profile of the cam means.
Figure 15:
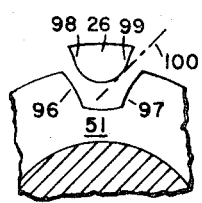
FIG. 15 is a fragmentary view similar to FIG. 13 showing still another modified profile of the cam means.

FIGS. 13, 14 and 15 are fragmentary views showing modifications of the cam operating regions. In FIG. 13, the cam actuating portions still have their sides disposed at substantially forty-five degrees while the cam follower portions have contacting corners 92 and 93 with round edges. In FIG. 14, a reverse situation is shown with respect to the cam actuating portions and the cam follower portions, in that the cam actuating portions have contacting corners 94 and 95 while the cam actuating portions have their sides disposed at substantially forty-five degrees. In FIG. 15, the sides 96 and 97 of the cam actuating portions and the sides 98–99 of the cam follower portions are curved to have a profile constructed substantially in accordance with the profile of the internal and external teeth of the stator and rotor elements, except that the extent of the curve is less, being substantially proportionate to the radius of the orbital cycle at the drive means to that at the rotor element 33. In other words, the profile of the teeth in FIG. 15 is such as to accommodate the orbital relative movements of the cam portions and not the orbital relative movements of the rotor element 33. At the tangent line, indicated by the reference character 100, in FIG. 15, the contacting curved segments are disposed at substantially forty-five degrees. In all the modifications, the cam actuating portion and the cam follower portions have a movement therebetween such that the cam portions circumferentially abut each other and transmit a torque therebetween in response to the circumferential relative movement and orbitally clear each other in the circumferential over-lapping relationship in response to the orbital relative movement.

In operation of the rotor element 33, the cam actuating means 40 is disposed to move axially (wobble) with reference to the cam follower means (bosses 26 and 27). Because of this axial movement, it is preferable to provide at least one of the contact surfaces of the cam actuating means and the cam follower means with a crown contour. In view of the fact that the width of the cam actuating means 40 is relatively narrow, the crown contour need not be very much to provide a smooth operation.

FIGS. 16 and 17 show a modified drive means for actuating the rotary valve means 28 by the actuating shaft 39. The modified drive means comprises a plurality of drive follower means B to G disposed at circumferentially spaced regional locations internally of the rotary valve and a plurality of drive actuating means 2 to 7 circumferentially disposed about the actuating shaft 39. The drive follower means B to G are circumferentially disposed with reference to the first axis about which the rotary valve rotates and the drive actuating means 2 to 7 are circumferentially disposed with reference to the shaft (second) axis. The drive follower means B to G comprise female wall means in the form of substantially a semicircle provided in an internal rim 47 within the rotary valve. The drive actuating means 2 to 7 comprise male wall means in the form of lugs provided on the outside of the actuating shaft. The diameter of the top of the lugs may be substantially the same as the diameter of the male gear teeth 71 and 73, whereby the lugs as well as the male gear teeth may pass through the central opening in the stationary valve and in the rotary valve. The female wall means and the male wall means are preferably six in number, being the same in number as the external teeth of the rotor 33 and may be designated as n−1 in number. The female wall means are circumferentially spaced apart from each other at substantially equal intervals (sixty degrees) about the first axis and the male wall means are circumferentially spaced apart from each other at substantially equal intervals (sixty degrees) about the shaft (second) axis. The drive actuating means 2 to 7 (male wall means) and the drive follower means B to G (female wall means) respectively engage each other in successive order at the regional locations with the respective drive means at each regional location constituting a pair of regional drive means for transmitting a torque therebetween in response to the combined movement of the actuating shaft 39. The drive follower means B to G and the drive actuating means 2 to 7 respectively have a relative movement therebetween defining substantially a clearance circle. This relative movement and the drive means effected by the male and female wall means is illustrated by the enlarged diagram in FIG. 18, in which the clearance circle is identified by the reference character 62, being the same in diameter as that of said substantially circular orbital movement identified by the reference character 61. The FIG. 18 is an enlarged representation of the pair of regional drive means at the location C–3, comprising the drive follower means C and the drive actuating means 3 which are just beginning to engage each other. The female wall means C is substantially semicircular having a center 50 which is located at a position within the internal rim 47. Thus, the female wall means C is slightly less than a complete semicircle. In construction, the female wall means C may be machined by an end-mill to a depth of substantially one-half the diameter thereof. The male wall means 3 have opposed arcuate corner means 36 and 37, both having a center 63. Thus, the opposed arcuate corner means comprises portions of substantially a male semicircle having a center 63. The diameter of the female wall means C is substantially equal to the diameter of the male semi-circle, plus the diameter of the clearance circle 62. The male drive means 3 is drawn by a full-line for the position X of the substantially circular orbital movement 61. For the positions Y, Z and A, the male drive means 3 is drawn by a dash-dot line. Thus, it is noted that the substantially circular orbital movement is counter-clockwise and the rotation of the rotary valve is clockwise. The plurality of drive actuating means and the plurality of drive follower means respectively engage each other in successive order at the regional locations with said respective drive means at each regional location constituting a pair of regional drive means for transmitting a torque therebetween in response to said combined movement of the actuating shaft 39. The order of successive engagements is counter-clockwise. After C–3, the next pair to engage is D–4. The pairs of regional drive means in response to the rotational movement rotates the rotary valve 28 substantially one rotation for each rotation of the actuating shaft with said pairs of regional drive means orbitally clearing each other in response to the substantially circular orbital movement. The "orbitally clearing" is demonstrated by the fact that some portion of the male arcuate corner means 36 follows (contacts) the female substantially semi-circular wall C at all portions therealong between the position X to the position Z of the substantially circular orbital movement 61 of the actuating shaft 39. Consequently, the rotational drive means is substantially free from drive interference incident to the substantially circular orbital movement. With freedom from drive interference, the "orbitally clearing" may be maintained within the limits of normal back-lash to provide a smooth drive. The travel between the position X to the position Z is substantially 60 degrees, which means that the substantially semi-circular female wall C circumferentially overlaps the male arcuate corner means 36 by an amount substantially equal to at least a one-sixth portion of said clearance circle. From position Z to A, the male arcuate corner means 36 is not contacting the female wall C. The above discussion applies to a situation having six male and six female drive means, being the same in number as the number of external teeth on the rotor 33. Thus, each pair of regional drive means is operative to rotate the rotary valve through an angle of substantially 60 degrees. Accordingly, at all times, at least one of the six pairs of regional drive means is in driving contact to rotate the rotary valve. The structure shown in FIGS. 16–18 is common to the structure shown in FIGS. 7–15 in that the male and female wall means respectively have a portion that engage each other at least at a place where the angle of engagement is substantially 45 degrees. In FIG. 18, the angle of engagement (tangent) between the male arcuate corner means 36 and the female wall C is substantially 45 degrees for the orbital position Y. The drive means is reversible and when the rotation of the rotary valve is counterclockwise, the male arcuate corner means 37 is disposed to contact the opposite side of the substantially semicircular female wall C.

What is claimed is:

1. Drive means for transmitting a torque between first and second members, said first member having a first axis about which it may rotate, said second member having a second axis disposed to generate an orbital movement defining a true circle about said first axis, said second member being also disposed for rotational movement about said second axis, whereby said second member has a combined movement comprising said orbital movement and said rotational movement, said first member having a plurality of drive follower means disposed at circumferentially spaced regional locations about said first axis with substantially equal intervals therebetween, said plurality of drive follower means being in excess of two in number, said second member having a plurality of drive actuating means circumferentially disposed about said second axis with substantially equal intervals therebetween, said plurality of drive actuating means being the same in number as said plurality of drive follower means, said drive follower means and said drive actuating means having a relative movement therebetween defining a clearance circle identical to said true circle, said drive actuating means and said drive follower means respectively engaging each other in successive order at said regional locations which said respective drive means at each regional location constituting a pair of regional drive means for transmitting a torque therebetween in response to said combined movement of said second member, said pairs of regional drive means in response to said rotational movement rotating said first member substantially one rotation for each rotation of said second member with said pairs of regional drive means orbitally clearing each other in response to said orbital movement, one of said drive means comprising a female wall and the other of said drive means comprising a male wall, said female wall including at least a portion of a true female circle, said male wall including at least a portion of a true male circle, said female circle having a diameter equal to that of said male circle plus the diameter of said clearance circle.

References Cited

UNITED STATES PATENTS

| | | | |
|---|---|---|---|
| 1,528,433 | 3/1925 | Kay | 64—31 |
| 3,217,517 | 11/1965 | Warnery | 64—31 |
| 2,684,581 | 7/1954 | Zublin | 64—9X |
| 3,243,973 | 4/1966 | Kraeling | 64—9 |
| 3,261,235 | 7/1966 | Henkel | 91—56X |
| 3,381,498 | 5/1968 | McDermott | 91—56X |
| 3,383,756 | 5/1968 | Smirl | 64—9X |
| 3,405,603 | 10/1968 | Woodling | 91—56 |
| 3,408,829 | 11/1968 | Gage | 64—9 |
| 2,181,162 | 11/1939 | Zaenger | 74—804 |
| 3,192,799 | 7/1965 | Pamplin | 74—805 |
| 3,389,618 | 6/1968 | McDermott | 74—804 |
| 3,425,620 | 2/1969 | Thornton | 74—804X |
| 3,431,863 | 3/1969 | Waldorff | 74—804X |

EVERETTE A. POWELL, JR., Primary Examiner